(12) United States Patent
Luechinger et al.

(10) Patent No.: US 8,267,279 B2
(45) Date of Patent: Sep. 18, 2012

(54) DEVICE FOR DISPENSING DOSAGES OF SUBSTANCES IN POWDER- OR PASTE FORM

(75) Inventors: Paul Luechinger, Uster (CH); Marc Zehnder, Volketswil (CH); Sandra Ehrbar, Gutenswil (CH)

(73) Assignee: Mettler-Toledo AG, Greifensee (CH)

(*) Notice: Subject to any disclaimer, the term of this patent is extended or adjusted under 35 U.S.C. 154(b) by 1085 days.

(21) Appl. No.: 12/121,408

(22) Filed: May 15, 2008

(65) Prior Publication Data

US 2008/0302835 A1    Dec. 11, 2008

(30) Foreign Application Priority Data

Jun. 8, 2007   (EP) ..................................... 07109899

(51) Int. Cl.
*G01F 11/20* (2006.01)
(52) U.S. Cl. ............ 222/1; 222/235; 222/311; 222/344; 222/333; 222/339; 222/408.5; 222/410
(58) Field of Classification Search .................. 222/196, 222/226, 233–235, 310–311, 344–345, 347, 222/351, 365, 404, 410, 160–161, 198–200, 222/408.5, 336, 339
See application file for complete search history.

(56) References Cited

U.S. PATENT DOCUMENTS

| | | | | |
|---|---|---|---|---|
| 2,357,387 A | * | 9/1944 | Dudley | 222/205 |
| 2,526,735 A | * | 10/1950 | Duce | 222/196 |
| 2,722,702 A | * | 11/1955 | Carter | 401/9 |
| 2,817,561 A | * | 12/1957 | Planiol | 406/132 |
| 4,267,555 A | * | 5/1981 | Boyd et al. | 345/10 |
| 5,145,009 A | * | 9/1992 | Mheidle et al. | 141/83 |
| 5,655,692 A | * | 8/1997 | Navin et al. | 222/413 |
| 6,237,815 B1 | * | 5/2001 | Schlosser | 222/241 |
| 6,375,035 B1 | * | 4/2002 | Munroe | 222/1 |
| 7,770,761 B2 | * | 8/2010 | Luechinger et al. | 222/344 |

FOREIGN PATENT DOCUMENTS

CH   0361381 A1 * 4/1962
WO   97/05962 A1   2/1997

* cited by examiner

*Primary Examiner* — Kevin P Shaver
*Assistant Examiner* — Andrew P Bainbridge
(74) *Attorney, Agent, or Firm* — Standley Law Group LLP

(57) ABSTRACT

A dosage-dispensing device has a drive unit and a receiver for a dosage-dispensing unit. The drive unit has a drive shaft. The dosage-dispensing unit has a delivery orifice with a closure element that is disposed in the delivery orifice. The closure element is coupled to the drive shaft when the device is in an operating state. The closure element provides the delivery orifice with an aperture cross-section that varies between a closed position and a maximally open position. To couple the drive shaft to the closure element and to open the delivery orifice, the drive unit linearly advances towards the dosage-dispensing unit. A closure spring holds the closure element in a closed position up to the point of complete coupling. To prevent premature opening of the delivery orifice during the coupling process, the drive shaft has limited linear mobility in a direction away from the dosage-dispensing unit.

19 Claims, 8 Drawing Sheets

DEVICE FOR DISPENSING DOSAGES OF SUBSTANCES IN POWDER- OR PASTE FORM

CROSS-REFERENCE TO RELATED APPLICATIONS

This application claims a right of priority under 35 USC §119 from European patent application 07 109 899.0, filed 8 Jun. 2007, the content of which is incorporated by reference as if fully recited herein.

TECHNICAL FIELD

The present invention relates to a dosage-dispensing device, preferably for a dosage material in the form of a powder or a paste.

BACKGROUND OF THE ART

Such dosage-dispensing devices are used in particular for the metering of small quantities of dosage material with high precision into target containers. Such target containers are in many cases set on a balance in order to weigh the quantity of the substance delivered out of the dosage-dispensing device, so that is can subsequently be processed further in accordance with a given purpose. The substance to be dispensed is located for example in a dosage-dispensing unit which is equipped with a metering head.

Dosage-dispensing devices for dry and/or powdery bulk materials, for example color dye powders, belong to the known state of the art and are in current use. For example, a device for dispensing measured doses of material is described in U.S. Pat. No. 5,145,009 to Mheidle ("Mheidle '009"), with a dosage-dispensing unit that has a closable outlet at the underside. The closure element is configured as a cone-shaped valve body whose diameter decreases in the upward direction, which can be moved vertically downwards in order to open the outlet opening, which rotates when in its open position, and which is equipped with means to advance the material towards the outlet opening. The dosage-dispensing unit is further traversed by a drive shaft which at top of the dosage-dispensing unit protrudes from the latter and is coupled to a drive mechanism. By way of a fastening flange at its underside, the dosage-dispensing unit is coupled to a drive unit of the dosage-dispensing device. Several pressure cylinders bear against the cover of the dosage-dispensing unit which by way of their stroke movement allow the outlet opening and thus the delivery rate of the dosage-dispensing unit to be influenced.

The pressure cylinders in this device are arranged on a support which is located above the dosage-dispensing unit, whose position can be adjusted up and down by means of a spindle, and which carries the drive mechanism for the rotatable valve body. A further motor actuates the spindle which engages a rotationally constrained spindle nut which is connected to the support, whereby the support, the pressure cylinders and the drive mechanism with the coupler clutch are moved in the vertical direction.

In the operating position, the adjusting elements of the pressure cylinders are in contact, or nearly in contact, with the cover of the dosage-dispensing unit, so that the adjusting elements are available for the opening of the valve.

The engagement of the coupler clutch and the movement of the valve body are thus accomplished by two different drive systems. In this drive unit, dosage material containers of different heights can be used. In spite of having separate drive systems for the clutch engagement and for the opening movement of the valve body, there is always the danger that dosage material could inadvertently be allowed to escape from the dosage-dispensing unit due to a linear displacement of the valve body during the clutch engagement phase. This can happen for example if the support is set in a position too close to the dosage material container. Furthermore, an inadvertent opening can also occur when a form-locking clutch is used, if the two clutch halves are offset against each other radially or in their angles of rotation and therefore push against each other instead of entering into mutual engagement.

A premature release of substance can be dangerous to the user of the dosage-dispensing device in particular with toxic substances. But also with non-critical substances, an unwanted release may be undesirable. This is annoying in particular if a powder mixture is to be assembled of a plurality of powders, where the individual components of the mixture are dispensed into the same target container from dosage-dispensing units which are set one after another into the drive unit.

Unless a very expensive controller and expensive stepper motors with position transducers are used, the clutch engagement has to be manually controlled and executed. This requires a great deal of attention by the user and a very long setup time in comparison to an automated clutch engagement.

The drive unit described in Meheidle '009 with the spindle-adjustable support and the pressure cylinders is characterized by a very complicated design structure and requires very expensive stepper motors with position transducers. Their position-sensing signals are processed by a microcomputer, and the stepper motors are controlled accordingly by the microcomputer. The requirements placed on the mechanism and the electronic circuitry are very high, as the motors need to stop immediately when the clutch engagement position has been attained. With this drive unit it is also necessary to know at least the height of the installed dosage-dispensing unit and thus the position of the clutch and to enter this height manually in the controller. Alternatively, at least the position of the clutch has to be determined, for example by means of an optical sensor, if a premature opening of the delivery orifice is to be prevented. However, the manual entry may be incorrect and lead to the problems described above. Furthermore, the use of sensors is problematic especially in dosage-dispensing devices because of the risk of contamination, as dosage material can adhere to the sensor elements whereby the sensitivity of the sensor can be compromised.

It is therefore the object of the present invention to create a drive unit of a dosage-dispensing device which is characterized by a simple design and a favorable manufacturing cost and which allows the drive unit to be coupled automatically to a dosage-dispensing unit with the highest possible degree of safety.

SUMMARY OF THE INVENTION

This task is solved with a dosage-dispensing device and with a method with the features defined in the independent patent claims.

A dosage-dispensing device includes at least one receiving device for a dosage-dispensing unit and at least one drive unit. The drive unit includes a drive shaft. The dosage-dispensing unit is designed so that it can be set into as well as removed from the drive unit, and it comprises at least one delivery orifice and at least one closure element which is arranged in the delivery orifice and which, in the operating state of the dosage-dispensing device, can be coupled to the drive shaft. Due to a linear mobility of the closure element along its central lengthwise axis in the delivery orifice and due to the shape of the closure element, the aperture cross-section of the delivery orifice is variable between a closed position and a maximally opened position. To couple the drive shaft to the closure element and to open the delivery orifice, the drive unit is configured so that it can be advanced in a linear movement towards the dosage-dispensing unit. The closure element of the dosage-dispensing unit is held in the closed position by means of a closure spring until a coupling engagement between the closure element and the drive shaft has been completed. To prevent that the delivery orifice could open up prematurely during the coupling phase, the drive shaft has limited linear mobility relative to the drive unit in the direction against the advance of the drive unit.

The reason why it is necessary to limit the mobility of the drive shaft against the advancing movement of the drive unit is that the movement for opening the closure element occurs likewise through the linear movement of the drive unit. To accomplish this limitation, there is a limiting stop formed on the drive unit and a counteracting stop on the drive shaft. As soon as the counteracting stop comes to rest against the limiting stop, the further movement of the drive shaft occurs in the direction of the advance of the drive unit, and the drive shaft pushes the closure element along a linear displacement path, whereby the delivery orifice is set free.

The force of the closure spring which holds the closure element in position needs to be larger than the counteracting force which is necessary to move the drive shaft against the advancing movement of the drive unit. This counteracting force corresponds for example to the weight force of the drive shaft and the friction which accompanies the displacement or, if the drive shaft is held under spring tension against the drive motor, it corresponds to the spring force of the tensioning spring.

Consequently, no special precaution is needed to move and align the drive unit against the dosage-dispensing unit in order to couple the drive shaft to the closure element. The arrangement as described compensates for length differences due to manufacturing tolerances of the individual interchangeable dosage-dispensing units as well as unavoidable variations in the advance of the drive unit which are caused for example by the inertia of the spindles and of the drive motor. This makes it unnecessary to use expensive sensors such a for example position transducers and a signal-processing unit for the further processing of the sensor signals.

Especially dosage material of a sticky or pasty consistency will not flow through the delivery orifice without additional mechanical assistance. It is therefore advantageous for the delivery of dosage material if the closure element and the drive shaft are configured so that they can be put into rotation. This causes a relative movement between the closure element and the housing of the dosage-dispensing unit which includes the delivery orifice. This relative movement promotes the passage of the dosage material through the delivery orifice.

As a further means of assisting the delivery of these kinds of dosage materials from the dosage-dispensing unit, the dosage-dispensing device is preferably equipped with an impact mechanism whose impacts can be transferred to the closure element. These shock impacts are independent of a current position of the closure element in relation to the delivery orifice and independent of an opening or closing movement of the closure element.

It has proven to be particularly advantageous that the impacts produced by the impact mechanism are transferred to the closure element by way of the drive shaft. As the drive shaft and the closure element have only a small mass of their own, considerably less impact energy is required than would be necessary if the impacts were applied to the housing of the dosage-dispensing unit. Consequently, the mechanical components of the impact mechanism and the drive unit can be designed with relatively small dimensions, and the mechanical components of the dosage-dispensing device overall are saved from wear. Furthermore, there is a significantly smaller effect on the peripheral devices such as for example force-measuring cells which are used for the control and regulation of the dosage-dispensing device and which serve to determine the amount of mass dispensed into a target container, and there is significantly less interference with the process of collecting measurement values. Also, the requirements placed on the damping of the understructure on which the dosage-dispensing device is set up are thereby substantially reduced.

As a means for producing shock impacts, the impact mechanism preferably has a tensioning mechanism and a lever. As soon as the lever is released by the tensioning mechanism, it is accelerated by an impact spring or by the closure spring. Depending on the direction of the acceleration, the lever will collide either with an impact surface area formed on the drive shaft or with a stop belonging for example to an adjusting device for the impact amplitude. The impact generates shock waves which propagate through the drive shaft to the closure element where they cause a displacement of the closure element which is very rapid but small in relation to the distance from the opening. As this displacement gives rise to large shear forces, it causes at least a momentary separation of the dosage material from the surface of the closure element. As the adhesion surface area is thereby reduced in the delivery passage cross-section, the dosage material can be delivered to the outside under the influence of gravity and a succession of several impacts.

The lever can additionally include a hammer mass in order to attain a higher impact energy.

Preferably, at least one play-adjusting device serving to set the play for the impact movement between the lever and the impact surface area, in particular a play-adjustment screw, is arranged on the lever. By adjusting the free play of the impact movement, it is possible to set the impact energy, as the acceleration distance of the lever can thereby be varied.

Furthermore, the impact mechanism can also include an adjustment device for the impact amplitude, in particular an adjustable end stop for the lever. This end stop serves to limit the amplitude of the impact movement. This has on the one hand an influence on the impact energy, and on the other hand it allows the aperture error of the passage cross section to be delimited. The aperture error occurs because the momentary change of the axial position of the closure element relative to the housing which is caused by the shock impacts has the result that during short time intervals a larger passage cross-section is set open than the size which would correspond to the setting for the advance of the drive unit. By delimiting the impact amplitude, this aperture error becomes predictable and can be taken into account by reducing the advance of the drive unit. If the impact amplitude adjusting device itself has elastic properties with a very high spring constant, an extraordinary amount of acceleration in the opposite direction will be generated immediately after the impact, similar to the end of a whip. This causes additional dosage material to separate itself from the closure element.

The impact amplitude adjusting device as well as the play-adjusting device can be equipped with an actuator drive to perform an automatic adjustment.

Instead of a tensioning mechanism with a lever, the impact mechanism can have an impact transfer member connected to the drive shaft and a crown sleeve bearing against the receiving device. The impact can be generated and transferred to the drive shaft by the movement of the impact transfer member following along the sawtooth-shaped contours of a serrated profile formed on the crown sleeve.

The impact frequency of the impact mechanism just described depends on the rpm-rate of the drive shaft. In the dispensing of some types of powders, this can lead to a reduced delivery rate of the dosage-dispensing unit. As a preferable concept, the crown sleeve is therefore supported on the receiving device in a way that allows the crown sleeve to be driven to rotate. By using a drive motor driving the rotation of the crown sleeve, the relative rpm-rate between the drive shaft and the crown sleeve becomes freely selectable.

The term "crown sleeve" also includes crown gears and devices of linear configuration which have a crown profile, for example gear racks whose tooth profiles can be followed by suitable means in order to produce shock impacts.

Even though the present invention makes it unnecessary to use a sensor, it is of course possible that a sensor is provided for the monitoring of the clutch engagement. This sensor can serve to send a feedback signal to a control- and regulating unit to confirm that the closure element is correctly coupled to the drive shaft. The sensor signal can also be used to detect the zero point. This zero point represents the axial position of the closure element relative to the housing of the dosage-dispensing at the exact point before the aperture cross-section of the delivery orifice ceases to be zero. This is important in cases where dosage-dispensing units of different heights are to be used, whose respective clutch engagement positions are different from each other.

Due to the limited range of linear movement of the drive shaft, the sensor can detect the position of the drive shaft relative to the end stops. Thus, the drive shaft simultaneously serves as the pick-up element of the sensor. With a suitable configuration of the drive unit, the sensor can be optimally protected by means of a drive mechanism housing against harmful influences and contamination by the dosage material, while only the drive shaft is exposed to these influence factors.

As a means for achieving even more safety against an unintended opening of the delivery orifice, the closure element of the dosage-dispensing unit can be designed to be cylindrical in its outline shape and can have at least one closure portion serving to close off the delivery orifice. Adjacent to the closure portion, the closure element can have a delivery portion serving to deliver dosage material to the outside, wherein the delivery portion has at least one surface depression that is recessed from the circumference of the cylinder.

Thus, the cylinder-shaped closure element has a cylindrical closure portion which has linear mobility in the delivery orifice and which due to its length in the axial direction offers the possibility to make the closure element significantly less susceptible to being unintentionally opened. Furthermore, the cylinder-shaped closure portion makes it possible that shocks can be imparted to the closure element also in the closed condition, as the associated axial movements of the closure element will in this case not lead to an opening of the delivery orifice. The possibility to shock the closure element in the closed condition has the advantage that powder particles can be shaken off which may for example be electrostatically charged and adhere to the underside of the closure element.

Depending on the design of the impact mechanism, the impacts cause different levels of acceleration of the drive shaft relative to the direction of movement. In the following, the largest possible acceleration of the closure element caused by the impact mechanism or in some cases by the closure spring will be referred to as peak acceleration. Thus, depending on the design of the impact mechanism, the peak acceleration can occur for example only in one sense of direction, while much lower acceleration levels occur in the opposite direction. This also affects the delivery rate. With extensive experiments using different dosage materials, it could be established that peak accelerations acting on the closure element against the direction of gravity will in some powders produce a higher delivery rate than peak accelerations in the same direction as the force of gravity. This can be explained by the fact that the dosage material which fills out the aforementioned recess, has as a consequence of its inertia a higher tendency to break loose from the recess and to separate itself better from the closure element if the peak acceleration occurs against the direction of gravity. With peak accelerations in the same direction as gravity, these powders rather tend to get compacted and thus to become more firmly stuck in the recess.

As discussed above, the peak acceleration has a decisive influence on the delivery rate. As the closure spring, specifically its spring force, is a controlling factor for the peak acceleration, one can install in the dosage-dispensing unit a closure spring which is matched to the properties of the dosage material contained in the dosage-dispensing unit. The different spring characteristic can be achieved by dimensioning the closure spring appropriately and/or by biasing the closure spring with a different amount of initial tension. The delivery performance rate is further enhanced through the influence of the impact amplitude adjusting device which has been described hereinabove.

It could further be observed with many powders that when the closure element is retracted into the delivery orifice, dosage material which has been only partially released from the recess will be caught by the rim of the delivery orifice and swept out of the recess.

As is self-evident, the dosage material contained in the dosage-dispensing unit is not limited to powders, but can also be a paste or a liquid.

As a clutch, there are a variety of separable form-locking or contact-force types of clutches, such as friction clutches, dog clutches and the like. It is particularly advantageous to use a profiled plug connection, for example with a profile shape of the clutch part analogous to screw bolts according to the norm standard EN DIN ISO 14583.

In accordance with this norm standard, the drive shaft of the dosage-dispensing device according to the invention can have a coupling portion with a six-lobe profile, and the closure element can have a coupling portion with a matching internal six-lobe profile.

The procedure whereby the dosage-dispensing device of the invention is made ready for a dispensing process can include the following steps:
  a. in a first step, the drive unit is set to the position for inserting a dosage-dispensing unit,
  b. in a second step, a dosage-dispensing unit is set into the receiving device,
  c. in a third step, the drive unit is moved along a linear displacement path in the direction towards the dosage-dispensing unit, the clutch portion of the drive shaft engages the clutch portion of the closure element and a sensor detects the completion of the clutch engagement and sends a signal to a control- and regulating unit that the dosage-dispensing device is ready to operate.

BRIEF DESCRIPTION OF THE DRAWINGS

Details of the dosage-dispensing device according to the invention are presented in the description of the examples of embodiments which are illustrated in the drawings, wherein identical parts are identified by identical reference numbers and wherein.

DETAILED DESCRIPTION OF THE PREFERRED EMBODIMENTS

Figure 1:
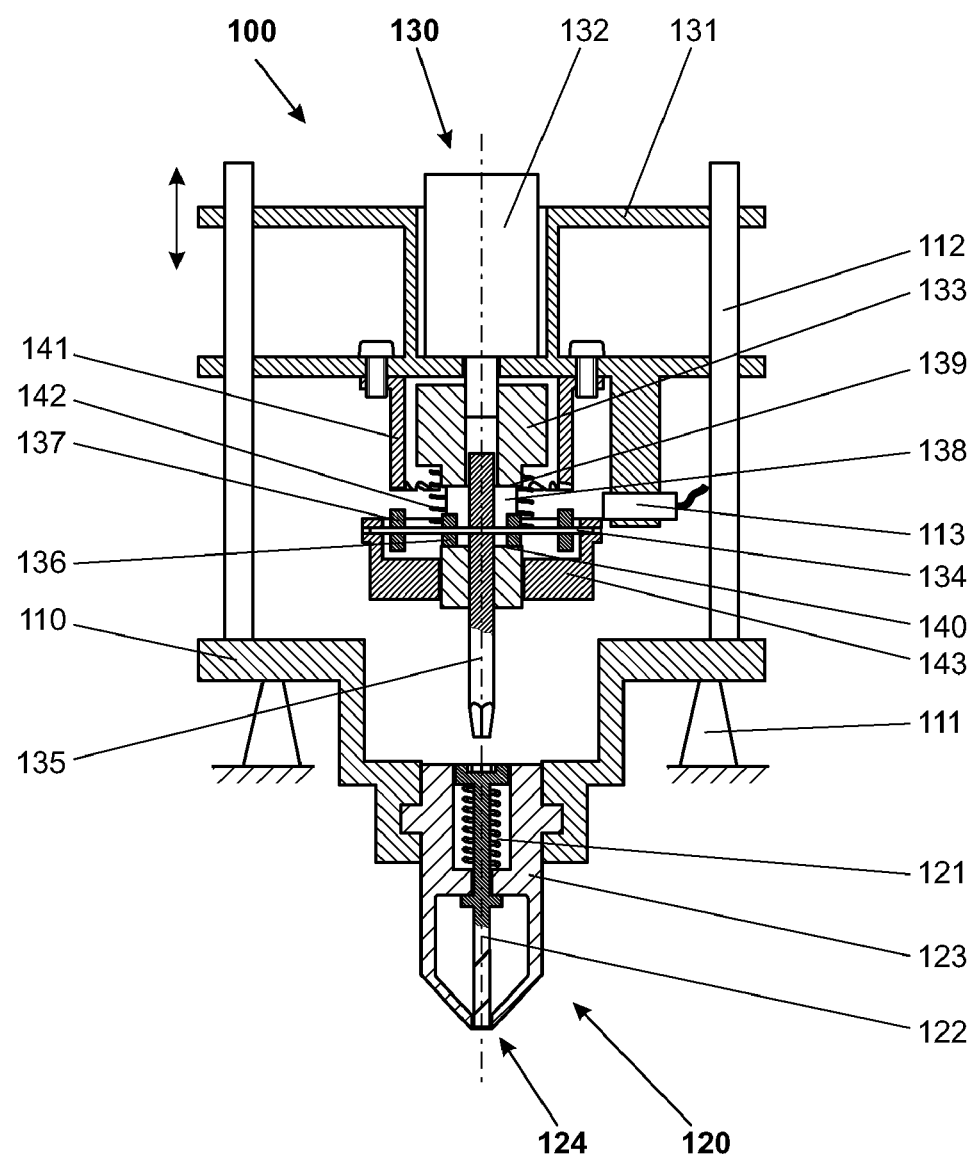
FIG. 1 is a sectional elevation view of a first embodiment of a dosage-dispensing device, wherein the drive shaft is not coupled to the closure element.

In FIG. 1, a dosage-dispensing device 100 is shown in a first embodiment represented in a sectional elevation drawing. The dosage-dispensing device includes essentially a receiving device 110 and a drive unit 130. The receiving device 110 which is shown in a symbolic way with supports 111 rests on the supporting base, for example a work table. The receiving device 110 further includes two linear guides 112 along which a carrier 131 of the drive unit 130 is guided with linear mobility.

As is self-evident, for the linear movement of the drive unit 130 relative to the receiving device 110 there needs to be an appropriate drive source arranged between the drive unit 130 and the receiving device 110. This can for example be a self-holding spindle drive. The attribute "self-holding" refers to the property of a mechanical system whereby a movement takes place only if the drive source is activated and does not occur as a result of external influence factors, for example under the influence of gravity. In the present invention, the linear movement or, expressed more precisely, the moving into place of the drive unit, and the movement to open and close the delivery orifice is effected only by the turning of a spindle of the spindle drive. Its kinematic ratio, specifically the pitch of the spindle thread, is selected so that the friction forces between the spindle and the spindle nut are larger than the weight force of the drive unit 130.

The drive unit 130 includes a motor 132 which is arranged between the linear guides 112 and is connected to the carrier 131. For the motor 132, most of the commercially available electric motors, stepper motors, gear motors, but also pneumatic or hydraulic motors can be used. Connected to the motor shaft of the motor 132 is a take-along sleeve 133 which transmits the torque of the motor 132 through a take-along roller axle 134 to a drive shaft 135 which is constrained in the take-along sleeve 133 with linear mobility and capable of being driven in rotary movement. The axis of rotation of the drive shaft 135 is oriented essentially in the vertical direction.

The take-along pin 134 in this embodiment carries four rotatably supported rollers 136, 137. The inner rollers 136 which are arranged close to the axis of rotation are at the same time held in a slot 138 which traverses the take-along sleeve 133 in the direction orthogonal to the axis of rotation and serve for the moment transfer of the motor torque. The lengthwise extension of the slot 138 further forms an upper end stop 139 in the direction towards the motor 133 and a lower end stop 140 in the direction away from the motor and thereby delimits the linear mobility of the drive shaft 135 in the axial direction. Between the take-along roller axle 134 and the take-along sleeve 133, there is in addition a biasing spring 142 arranged which pushes the inside rollers 136 against the lower end stop 140. As a result, when the drive shaft is in the uncoupled state, the end of the drive shaft 135 that faces away from the motor always takes a defined position in relation to the carrier 1 31.

The outer rollers 137 serve to transmit shock impacts to the drive shaft 135. These impacts are generated by means of a crown sleeve 141 which is rigidly connected to the carrier 131. As the outer rollers 137 follow the contours of the serrated crown profile of the crown sleeve 141 due to the rotation of the drive shaft 135, oscillatory movements or impacts are imparted to the drive shaft 135 by way of the take-along roller axle 134 which is rigidly connected to the drive shaft 135. The number of impacts per revolution of the drive shaft 135 thus depends on the number of teeth of the crown profile. The impact energy of the individual impact can be selected through the design of the crown profile and the rpm-rate of the drive shaft 135.

FIG. 1 shows the dosage-dispensing device 100 in the operating state, meaning that a dosage-dispensing unit 120 is set in place in the receiving device 110. The dosage-dispensing unit 120 includes a housing 123, a closure element 122 and a closure spring 121. The closure spring 121 holds the closure element 122 in a closed position up to the point where the spring force of the closure spring 121 is overcome by the push exerted against the drive shaft 135. In the closed position, the closure element 122 closes off a delivery orifice 124 formed in the housing 123. The construction and the function of the dosage-dispensing unit 120 and the design of the closure element 122 will be discussed in more detail hereinafter in the description of FIG. 7.

The crown profile is designed preferably in a sawtooth pattern so that by means of the rising flanks of the crown profile a spring element, for example the closure spring 121 of the dosage-dispensing unit 120 is put into tension, while the nearly vertical descending flanks release the spring element from its tension-biased state. A crown profile of this design dictates the direction of the follower element, i.e. the sense of rotation, but it allows very high accelerations of the closure element 122 to be achieved at the descending flanks.

Arranged on the take-along roller axle 134 is a position-indicating ring 143 through which the momentary position of the drive shaft 135 relative to the carrier 131 can be detected. This is preferably accomplished by means of a sensor 113, for example an optical, inductive or acoustical sensor. The monitoring of the position offers a variety of advantages. For example, if dosage-dispensing units 120 of different heights are used, the clutch engagement can be monitored in a simple manner, and in particular the zero point of the system can be established. This zero point represents the starting point of the opening movement of the closure element 122 relative to the housing 123 and thus precisely the point at which the inner rollers 136 enter into contact with the upper end stop 139 and/or the outer rollers 137 enter into contact with the crown sleeve 141. Of course, in place of the take-along axle 134 and the rollers 136, 137 one could also use a simple glider element with four glide areas if the contact pressure is minimal and as a result there is no wear or very little wear at the glide areas.

Figure 2:
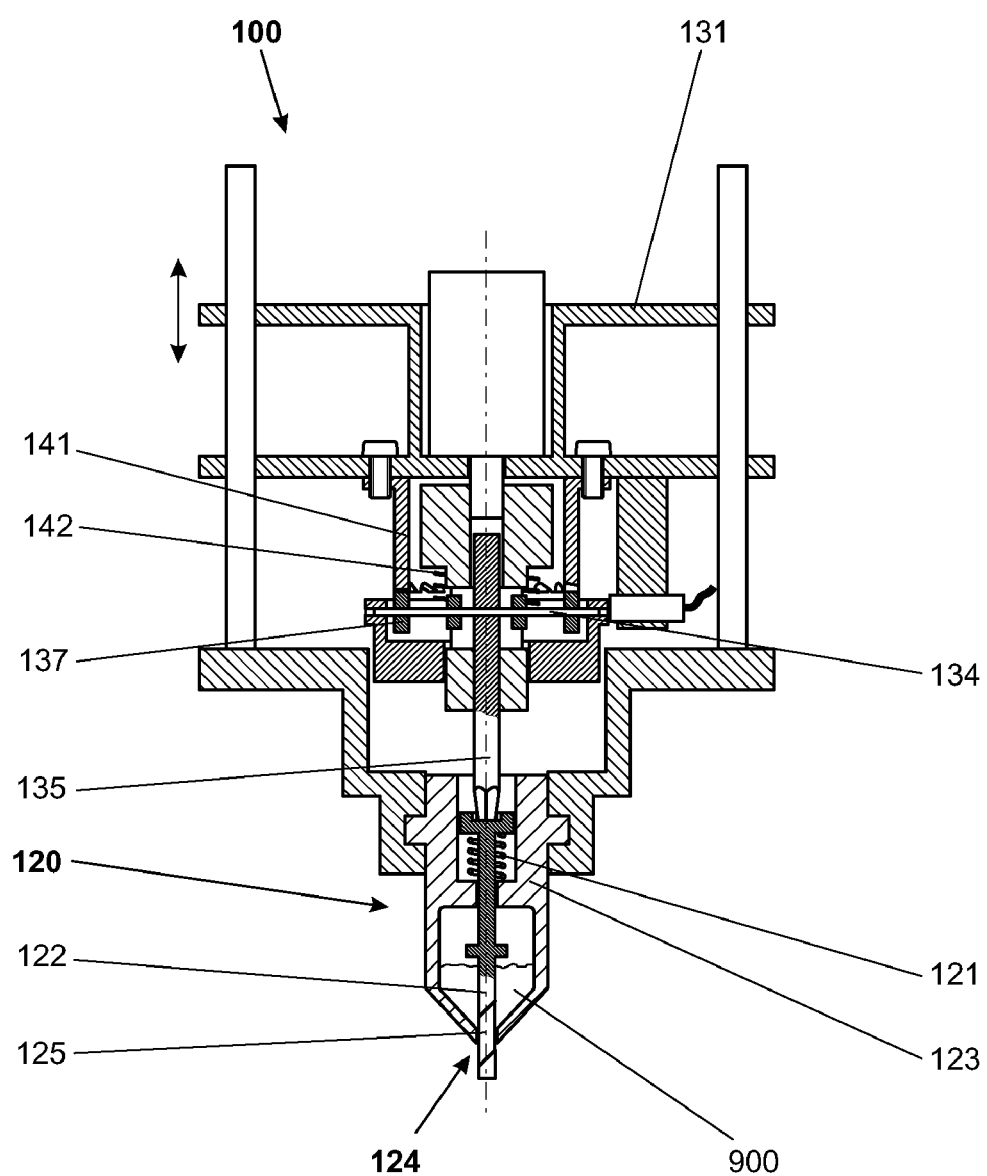
FIG. 2 is a sectional elevation view of the FIG. 1 dosage-dispensing device with the drive shaft coupled to the closure element.

In FIG. 2, the FIG. 1 dosage-dispensing device 100 is shown again in a sectional elevation, with the drive shaft 135 coupled to the closure element 122. The carrier 131 is advanced to the point where the zero point has been passed and where a recess 125 formed on the closure element 122 is positioned in the delivery orifice in such a way that an exit passage cross-section is opened up, which allows dosage material 900 contained within the housing 123 to flow out of the dosage-dispensing unit 120.

In the description of the further drawing figures, elements that are identified by the same reference symbols are to a large extent identical to the components described in FIGS. 1 and 2.

As FIG. 2 clearly illustrates, the outer rollers 137 are pushed by the spring force of the closure spring 121 against the crown profile of the crown sleeve, breaking the resistance by the forces of gravity and of the biasing spring 142. As soon as the drive shaft 135 is set into rotation, the outer rollers 137 which are connected to the drive shaft through the take-along roller axle 134 track along the contour of the crown profile, whereby an oscillating linear movement of the drive shaft 135 is generated and transferred to the closure element 122.

Figure 3:
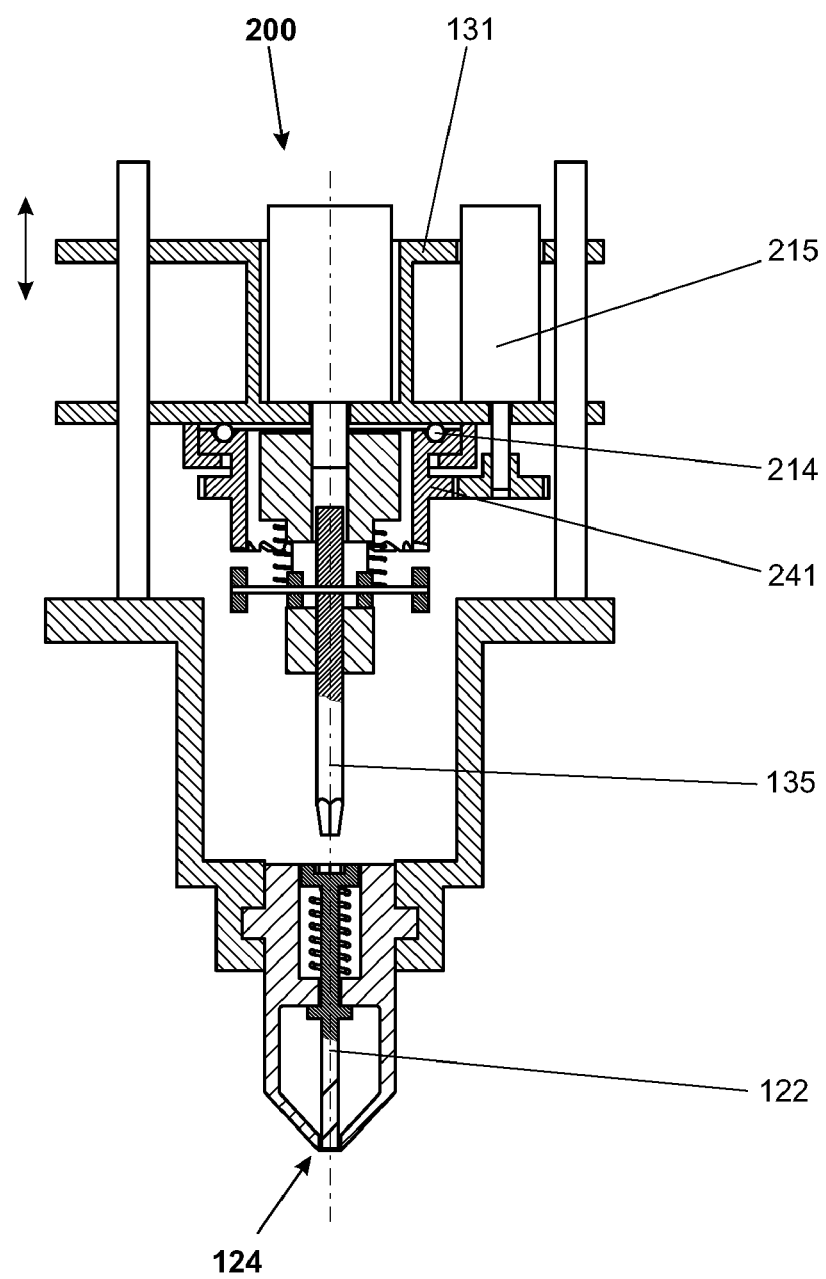
FIG. 3 is a sectional elevation view of a second embodiment dosage-dispensing device, wherein the drive shaft is not coupled to the closure element.

FIG. 3 schematically illustrates a dosage-dispensing device 200 in a second embodiment seen in a sectional elevation, wherein the drive shaft 135 is not coupled to the closure element 122. Instead of having the crown sleeve rigidly connected to the carrier 110 by means of screws, the second embodiment has a crown sleeve 241 designed to be rotatable in response to a rotary drive source. The crown sleeve 241 bears against the carrier 131 through a rotary thrust bearing 214 and can be driven by a motor 215. In the illustrated embodiment, the crown sleeve 241 which is rotatable in response to a rotary drive source is arranged in coaxial alignment with the drive shaft 135. However, this is not an absolute requirement; the axis of rotation of the crown sleeve 241 can also be arranged at an arbitrary angle in relation to the central longitudinal axis of the drive shaft 135. To produce shock impacts, the drive shaft 135 in this embodiment does not need to be set in rotary motion. Rather, the rotation of the drive shaft 135 and the impact frequency can be selected separately as needed.

The rotation of the drive shaft 135 and closure element 122 can lead to the grinding up of powder particles in the area of the delivery orifice. Especially with powders that are susceptible to destruction, for example active ingredients of pharmaceuticals, the medicinal effect of the active ingredient can change drastically as a result of the grinding up of the powder particles alone because of an increase in surface area or a destruction of the surface structure. With the second embodiment with a crown sleeve 241 which is rotatable in response to a rotary drive source, such effects can be largely avoided.

Figure 5:
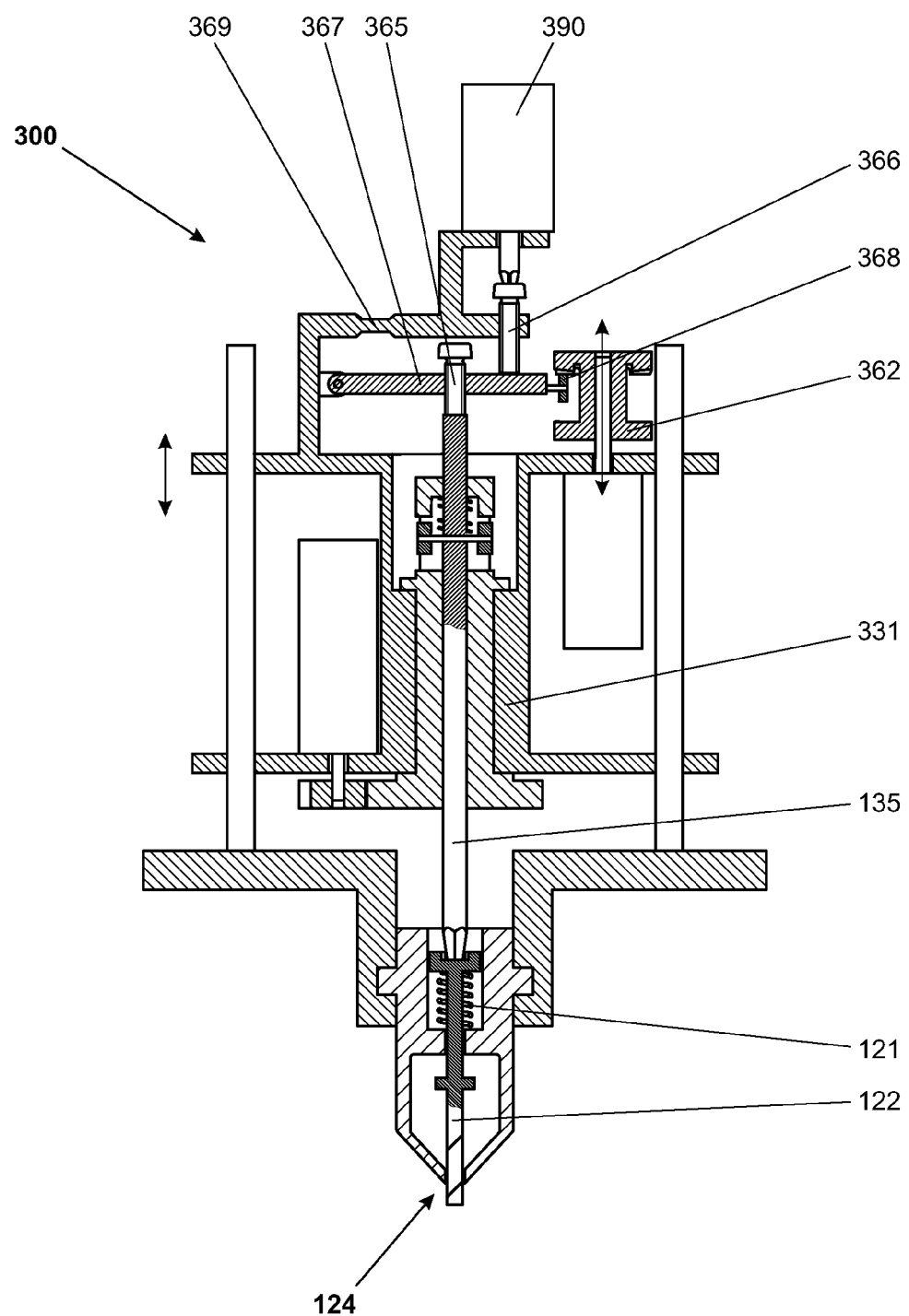
FIG. 5 is a sectional elevation view of the FIG. 4 dosage-dispensing device with the drive shaft coupled to the closure element.
Figure 6:
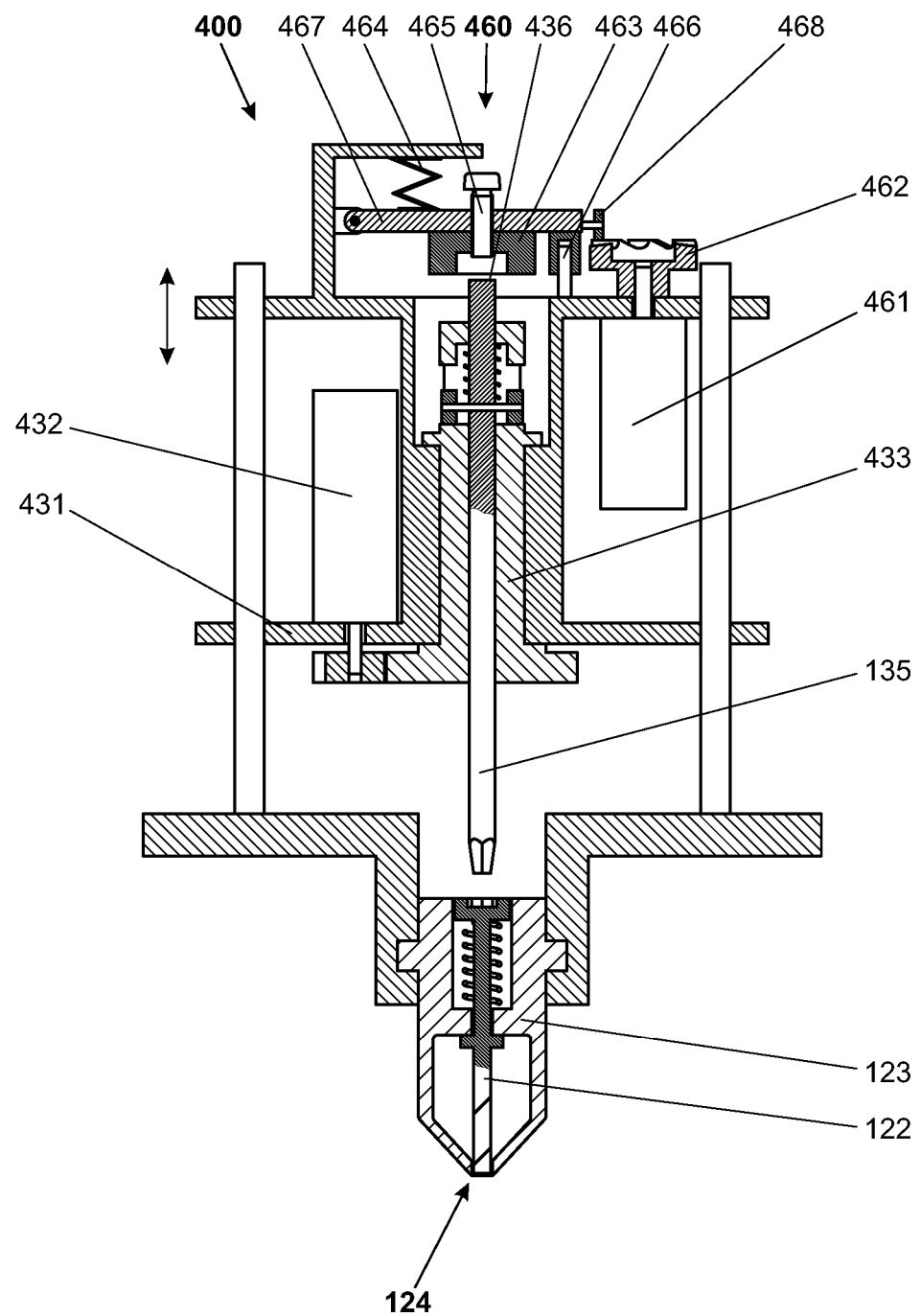
FIG. 6 is a sectional elevation view of a fourth embodiment of a dosage-dispensing device, wherein the drive shaft is not coupled to the closure element.

The hardness of the impacts, their period interval and amplitude depend on the rate of rotation and on the crown profile. This factor strongly limits the adjustability of the impact energy. To provide a dosage-dispensing device that can be better adapted to the dosage material, the variant embodiments are proposed which are illustrated in FIGS. 4 to 6.

Figure 4:
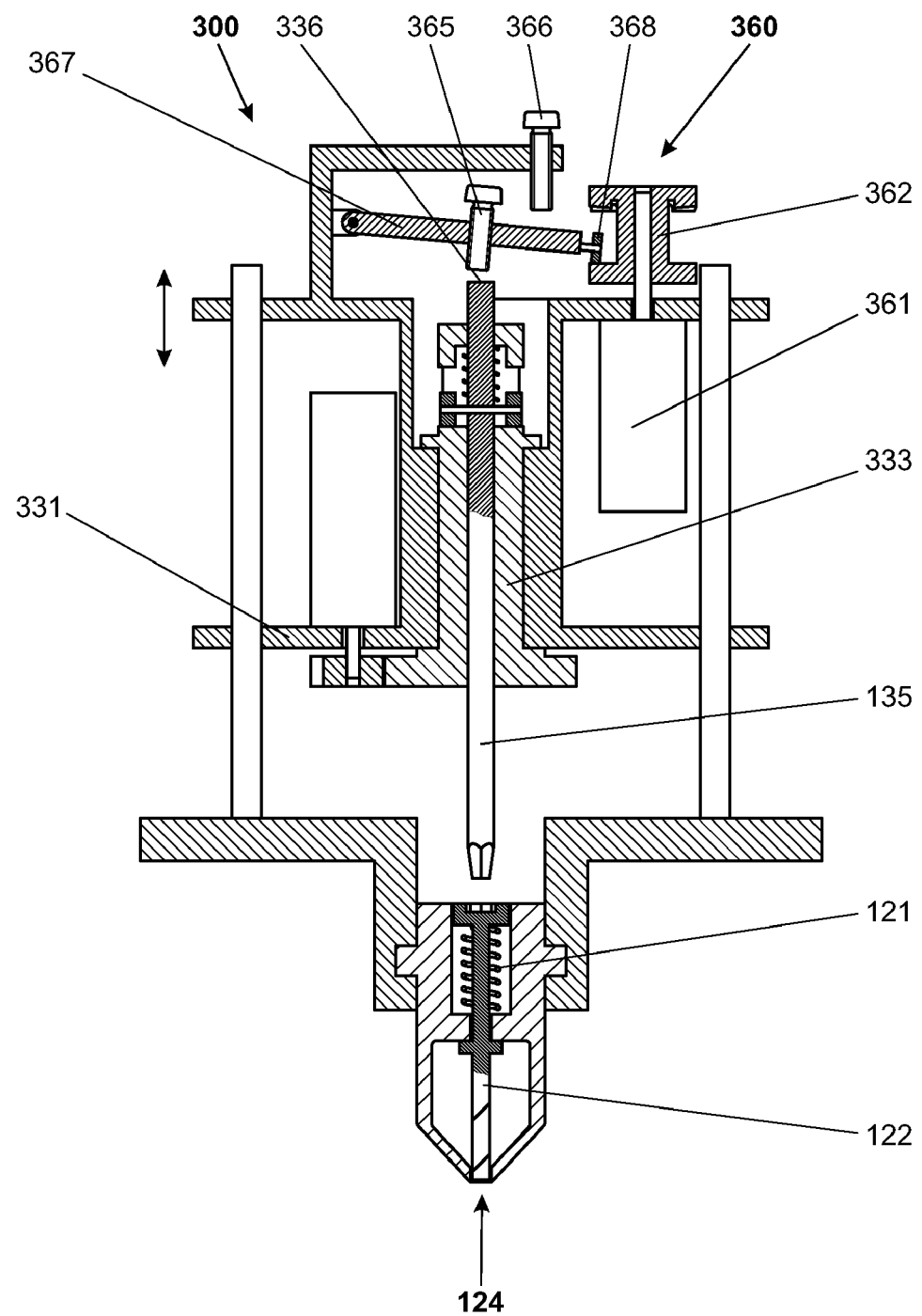
FIG. 4 is a sectional elevation view of a third embodiment of a dosage-dispensing device, wherein the drive shaft is not coupled to the closure element.

FIG. 4 schematically illustrates a dosage-dispensing device 300 in a third embodiment represented in a sectional elevation drawing, wherein the drive shaft 135 is not coupled to the closure element 122. Instead of a crown sleeve and outer rollers, the third embodiment is equipped with an impact mechanism 360.

The impact mechanism 360 includes a lever 367 and a tensioning mechanism 361 whose crown wheel 362 is driven by a motor. A first end of the lever 367 is pivotably supported on the carrier 331, and the opposite, second end of the lever carries a contact roller 368 to which the action of the tensioning mechanism 361 is transferred. An impact surface area 336 is formed on the drive shaft 135. During the coupling of the drive shaft 135 to the closure element 122, the drive shaft 135 is moved in a straight line relative to the take-along sleeve 333 until the impact surface area 336 meets a play-adjusting device 365, whereby the contact roller 368 of the lever 367 is pushed into contact with the crown wheel 362 of the tensioning mechanism 361. With a further advance of the carrier 331 the drive shaft 135 can not move further against the direction of the carrier advance movement because the contact roller 368 now rests against the crown wheel 362, and as a consequence, the spring force of the closure spring 121 is overpowered and the delivery orifice 124 is opened.

As soon as the motor puts the crown wheel 362 in rotation, the contact roller 368 tracks the contour of the crown profile and transfers the impacts which are thereby produced to the drive shaft 135 by way of the lever 367. With the impact amplitude adjuster device 366, the impact amplitude can be limited as a result of the lever 367 coming to rest against the impact amplitude adjuster device 366 before the contact roller 368 has reached the bottom of the crown profile grooves.

FIG. 5 shows essentially the dosage-dispensing device 300 of FIG. 4 in a sectional elevation, with the drive shaft 135 coupled to the closure element 122. In comparison to FIG. 4, it is readily apparent how the closure spring 121 pushes the contact roller 368 against the crown wheel 362. As soon as the crown wheel 362 begins to turn, its crown profile is followed by the contact roller 368, whereby impacts are generated which are transferred by way of the lever 367 to the drive shaft 135 and the closure element 122. As further outlined in the drawing, the impact amplitude adjuster device 366 is connected to an adjustment actuator 390, which allows the impact energy and impact amplitude to be changed during operation. The impact amplitude adjuster device 366 itself has elastic properties with a very high spring constant as expressed symbolically in FIG. 5 through a flexure section 369 of reduced thickness formed in the carrier 331. Due to these elastic properties of the impact amplitude adjuster device 366, an extraordinarily high acceleration of the lever 367, of the drive shaft 135 and of the closure element 122 is generated in the opposite direction immediately after the impact, comparable to the end of a whip. This causes more dosage material to separate itself from the closure element 122.

As soon as the drive shaft 135 is coupled to the closure element 122, a further movement of the carrier 331 in the advancing direction will displace the closure element 122 relative to the housing 123, and the delivery orifice 124 is opened. Of course, it is also possible for the crown wheel 362 to be adjustable along a straight vertical path. This adjustment possibility could be used to open the delivery orifice 124 or to fine-adjust the cross-section of the outlet passage of the delivery orifice 124. In this case, the demands on the drive mechanism (not shown in the drawing) for the carrier 331 could be lowered. Specifically the requirements could be reduced for the positioning accuracy of the drive of the carrier advance movement.

Likewise, the play-adjusting device 365 could, of course, be equipped with an actuator drive, so as to allow the respective adjustments to be made also during operation of the dosage-dispensing device 300.

All of the preceding embodiments have impact mechanisms imparting shocks to the drive shaft in such a way that the peak acceleration is in each case directed against the direction of gravity. In the following, the design of a dosage-dispensing device is described in which the impact mechanism effects a peak acceleration of the drive shaft in the same direction as the force of gravity.

FIG. 6 schematically illustrates a dosage-dispensing device 400 in a fourth embodiment in a sectional elevation drawing, wherein the drive shaft 135 is not coupled to the closure element 122. Instead of a crown sleeve and outer rollers, the fourth embodiment is equipped with an impact mechanism 460. The impact mechanism 460 includes a tensioning mechanism 461 which serves to bias a hammer mass 463 against the combined forces of gravity and an impact spring 464 and to subsequently release the hammer mass. To guide the movement of the hammer mass 463, the latter is rigidly connected to a lever 467 with a first lever end pivotably connected to the carrier 431 and a second lever end carrying a contact roller 468 to which the action of the tensioning mechanism 461 is transferred. Of course, other ways of guiding the movement of the hammer mass 463 are also conceivable, for example linear guides.

The tensioning mechanism 461 illustrated in FIG. 6 includes essentially a motor and a crown wheel 462. Of course, it is possible to use other solutions to effect the tensioning and releasing of the hammer mass 463. After the hammer mass 463 has been released by the tensioning mechanism 461, gravity and the spring force of the impact spring 464 will accelerate the hammer mass towards an impact surface area 436 formed on the drive shaft 135, until the hammer mass collides with the impact surface area 436 and generates a shock wave in the drive shaft 135.

The hammer mass 463 preferably has at least one play-adjusting device 465 serving to adjust the impact play between the hammer mass 463 and the impact surface area 436, in particular a play-adjusting screw which can be locked in a fixed position. By adjusting the impact play, the impact energy of the hammer mass 463 can be adjusted, since the acceleration distance of the hammer mass 463 can be varied with an increasing amount of play.

Furthermore, the impact mechanism 460 can also include an adjustment device 466 for the impact amplitude, in particular an adjustable end stop for the hammer mass 463. This end stop serves to limit the amplitude of the impact movement. This has on the one hand an influence on the impact energy, and on the other hand it allows setting a limit on the aperture error of the passage cross section of the delivery orifice 124. The aperture error occurs as a result of the momentary change of the axial position of the closure element 122 relative to the housing 123 which is caused by the shock impacts. By limiting the impact amplitude, this aperture error becomes predictable and can be taken into account by reducing the advance movement of the carrier 431 and of the drive shaft 135.

The drive shaft 135 is constrained with linear mobility in a take-along sleeve 433 which is analogous to the take-along sleeve shown in FIG. 4. The take-along sleeve 433 is likewise driven by a motor 432.

The rotary axes of the drive shafts in the illustrated embodiments are oriented in the vertical direction. It is considered self-evident that embodiments of the invention are possible where the drive shafts can be arranged at any desired angle relative to the vertical direction.

Figure 7:
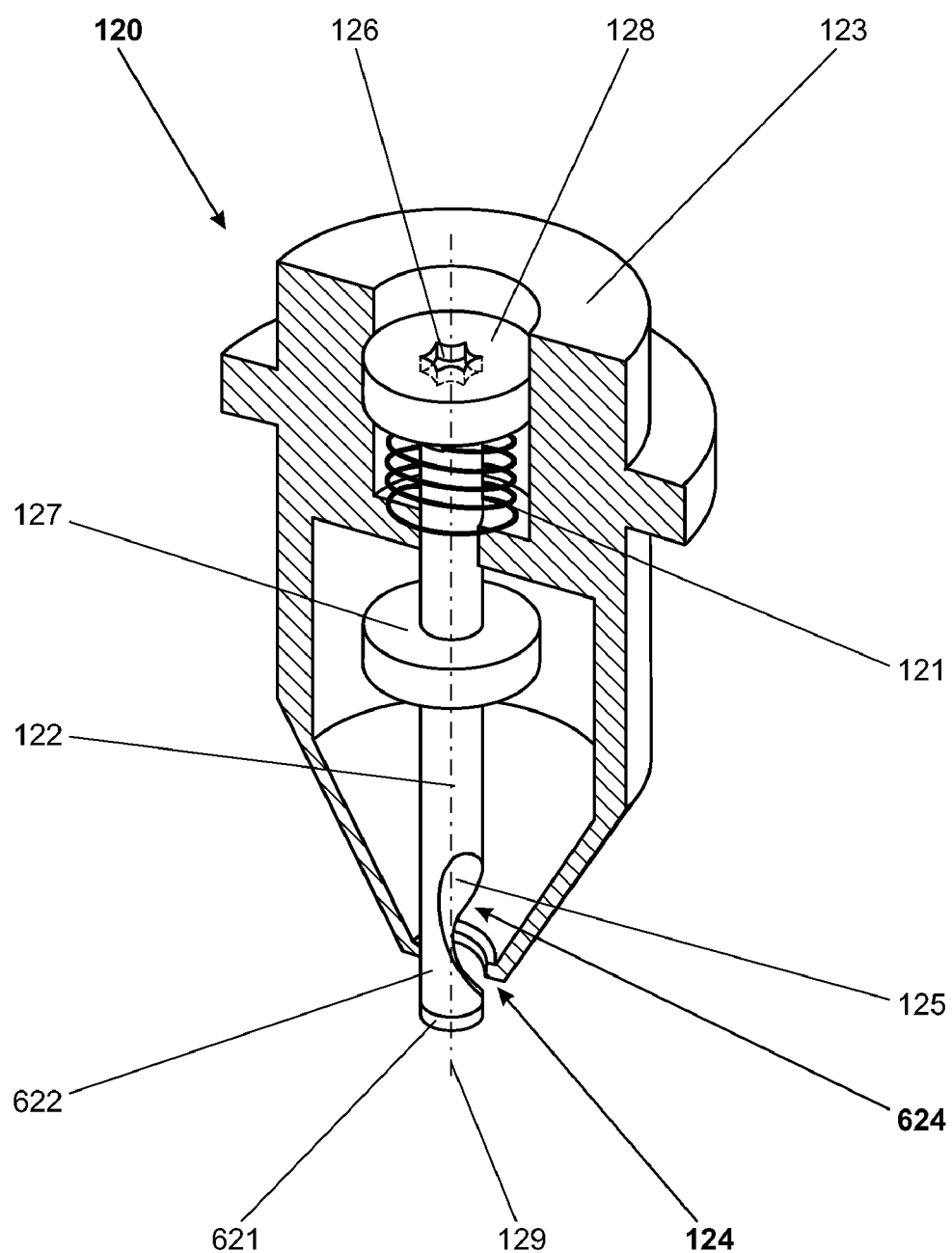
FIG. 7 shows a dosage-dispensing unit with a closure element in the open position, shown in a three-dimensional view with the housing cut in a lengthwise section.

FIG. 7 shows a dosage-dispensing unit 120 with a closure element 122 in a three-dimensional view with the housing 123 of the dosage-dispensing unit 120 cut in a lengthwise section. The delivery orifice 124 is partially opened. The closure element 122 is shaped cylindrically and extends along the central longitudinal axis 129 of the dosage-dispensing unit 120. The closure element 122 is designed to allow rotation about, as well as linear movement along, the central longitudinal axis 129. Located in relation to the operating position at the upper end of the closure element 122 is a head portion 128 in which a clutch half 126 is formed which in FIG. 6 consists of a six-lobe blind hole. A drive shaft which is not shown in this drawing can be inserted into this clutch half.

A closure spring 121 is arranged between the head portion 128 and the housing 123 and through its spring force holds the closure element 122 in a closed position in the uncoupled state, where a flange 127 which is formed on the closure element 122 comes to rest against the housing 123 and thereby defines the closed position of the dosage-dispensing unit 120.

The closure element 122 has a closure portion 621 which is designed in a cylindrical shape and which in the closed position shuts off the delivery orifice with a precise fit. In the position for dispensing material, the delivery orifice 124 is at least partially opened and thus forms a passage opening which represents an effective orifice aperture. In this case, a delivery portion 122 of the closure element 122 which is arranged adjacent to the closure portion 621 reaches into the delivery orifice 124.

The longer the cylindrical closure portion 621 is configured in the direction of the central longitudinal axis 129, the less susceptible is the dosage-dispensing unit 120 to being inadvertently opened during the engagement of the clutch. Furthermore, a closure portion 621 of a longer design allows impacts to be applied to the closure element 122 even when the delivery orifice 124 is closed, without allowing the delivery orifice 124 to be opened up by the impacts. It is further possible that in the process of closing the delivery orifice 124 some dosage material may accumulate and be caught between the flange 127 and the housing 123, so that the closure element 122 cannot completely return to the original closed position relative to the housing 123. With a longer configuration of the closure portion 621, the problem that the dosage-dispensing unit 120 cannot be completely closed again because of dosage material being caught can likewise be defused.

In the delivery portion 622, the closure element 122 has a surface depression in the shape of a recess 125. The surface of the recess 125 is continuous and forms a delivery surface area 624. Relative to the operating position, the closure portion 621 in this embodiment is located below the delivery portion 622, meaning that it forms the bottom end of the closure element 122. Thus, the end surface which forms the bottom edge of the closure element 122 can close off the delivery orifice 124 of the dosage-dispensing unit 120 in flush alignment. The delivery orifice 124 in this embodiment has a diameter essentially equal to the diameter of the closure portion 621, so that the closure element 122 can be moved into and out of the delivery orifice 124 with an exact fit, whereby the latter can be completely closed.

Figure 8:
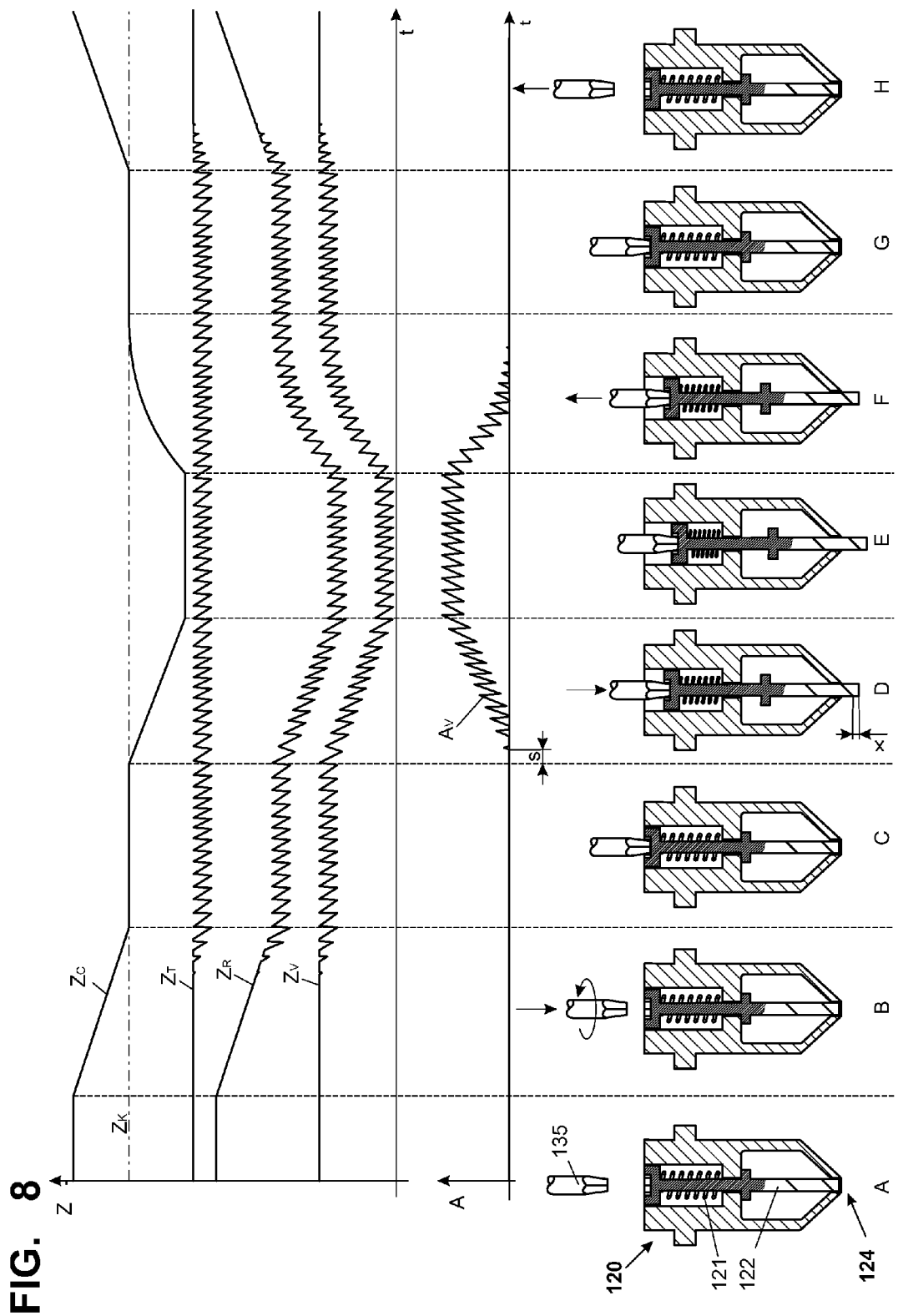
FIG. 8 schematically illustrates the sequence of movements performed by different elements of the dosage-dispensing device shown in FIGS. 3 and 4 during the phases of clutch engagement, opening and closing of the delivery orifice, and clutch disengagement

FIG. 8 schematically illustrates the time profiles $Z_C$, $Z_T$, $Z_R$, $Z_V$ of the movements performed by different elements as well as the time function of the cross-sectional variation $A_V$ of the delivery orifice during a cycle of clutch engagement, opening, closing and clutch disengagement of the dosage-dispensing device shown in FIGS. 3 and 4. The time profiles $Z_C$, $Z_T$, $Z_R$, $Z_V$ are subdivided into the phases A through H.

Below the graphs of the time profiles $Z_C$, $Z_T$, $Z_R$, $Z_V$ a sectional view of the dosage-dispensing unit 120 of FIG. 7 is shown for each phase with a position of the closure element 122 that is typical for the respective phase.

The movement of the carrier into and out of the operating position is illustrated by the profile graph $Z_C$. In phase A, a dosage-dispensing unit 120 can be set into the receiving device (not shown in the drawing), as the closure element 122 and the drive shaft 135 are not yet coupled to each other.

In phase B, the carrier is advanced towards the dosage-dispensing unit 120, so that the drive shaft 135 approaches the dosage-dispensing unit 120, as illustrated by the profile graph $Z_R$ of the drive shaft. Preferably, the drive shaft 135 is at the same time set into rotation in order to assist in the clutch engagement. This is particularly important in the case where a pluggable, form-locking clutch is used to connect the closure element 122 to the drive shaft 135, as shown in FIGS. 1 to 8. The minimal speed of rotation of the drive shaft 135 depends here on the speed at which the carrier advances towards the operating position and on the limited amount of linear mobility of the drive shaft 135 against the advance of the carrier, given that for example the six-lobe profile of the drive shaft can be inserted into the internal six-lobe profile only at discrete rotary positions which are spaced 60° apart from each other. The point of engagement $Z_K$ is reached towards the end of phase B, meaning that the drive shaft 135 is coupled to the closure element 122 and the drive shaft 135 pushes the contact roller which is arranged on the lever against the crown profile, as can be seen in FIGS. 4 and 5. The weight of the drive shaft 135 now rests on the closure spring 121. As illustrated in phase B, the contact roller follows the contour of the crown profile to an increasing extent, depending on the position of the carrier in its advance movement, whereby the impacts of the impact mechanism are produced and transferred to the drive shaft 135. The time profile $Z_T$ of the impacts generated by the impact mechanism which is shown in FIG. 8 is strongly exaggerated in comparison to the time profile of the advance movement $Z_C$ of the carrier in order give a better illustration of how the movement profiles $Z_C$, $Z_T$, $Z_R$, $Z_V$ work together. As soon as impacts are generated by the impact mechanism, they are also transferred to the closure element 122 which is coupled to the drive shaft 135, as shown in FIG. 8 in the movement profile of the closure element $Z_V$. However, because of the small amplitude of the impacts, the delivery orifice 124 is not yet being opened at this point.

In phase C, no advance movement of the carrier takes place. This can be necessary in a case where the dosage material in the dosage-dispensing unit 120 needs to be conditioned prior to the dispensing process, for example by stirring or vibrating. Of course, the advance movement of the carrier can also occur without interruption, in which case phase D directly follows phase B.

In phase D, the carrier continues to be advanced towards the dosage-dispensing unit 120, but as the drive shaft 135 now bears against the lever and the contact roller bears against the crown wheel, the drive shaft 135 cannot be moved further in the direction against the advance movement of carrier. The drive shaft 135 therefore continues to be advanced in the direction towards the dosage-dispensing unit 120 or, expressed more precisely, the opening phase is initiated as the closure spring 121 is being compressed, the delivery orifice 124 is opened up and the cross-section of the orifice aperture $A_V$ is increasing. In phase D in FIG. 8, the opening of the delivery orifice 124 occurs with a delay S which is caused by the length X of the closure portion of the closure element 122.

In phase E, the delivery orifice 124 of the dosage-dispensing unit 120 is completely opened up, meaning that only a purely oscillatory variation of the aperture cross-section $A_V$ is taking place which is determined by the impact frequency of the impact mechanism.

As soon as the dispensed quantity of dosage material approaches the target weight, as illustrated in phase F, a movement of the carrier in the opposite direction of the advance movement, more specifically the closing movement, is initiated. The profile $Z_C$ of the movement in the opposite direction of the advance movement of the carrier is shown as a non-linear section of the graph in FIG. 8. This is intended to illustrate that the opening movement as well as the closing movement do not have to be linear functions. The closing of the delivery orifice 124 occurs based on the length X of the closure portion before the point where the clutch engagement point $Z_K$ has been reached.

In phase G, the dosage-dispensing device has the same initial position as in phase C. As an example, if particles are sticking to the bottom surface of the closure element 122, they can be shaken loose from the closure element 122 through the shocks produced by the impact mechanism. Phase G can be the initial position for a further delivery of a substance dose in accordance with phases D through F. If no further dosage material is to be dispensed, the closure element 122 can be uncoupled from the drive shaft 135 by moving the carrier in the opposite direction of the advance movement. Even though the invention has been described through the presentation of specific embodiments, it is considered self-evident that numerous further variant embodiments can be created based on a knowledge of the present invention, for example by combining features of the individual embodiments with each other and/or by interchanging individual functional units of the embodiments. In particular, further embodiments are conceivable which have two or more impact mechanisms acting on the drive shaft, and for example also on the housing of the dosage-dispensing unit. It is likewise conceivable that an impact mechanism has two tensioning mechanisms or at least two crown wheels or crown sleeves. In combination with a manually releasable clutch and a bi-stable closure spring, this kind of impact mechanism allows high levels of acceleration to be achieved in as well as against the direction of gravity. Accordingly, such combinations and alternative solutions are considered to be part of the invention.

What is claimed is:

1. A device for dispensing a dosage material, comprising:
    a dosage-dispensing unit comprising a delivery orifice with a closure element and a closure spring arranged therein, an aperture cross-section of the delivery orifice being variable from a closed position to a maximally open position due to the shape of the closure element and the linear mobility in the delivery orifice of the closure element along a central longitudinal axis thereof;
    a receiving device for the dosage-dispensing unit; and
    a drive unit comprising a drive shaft which, in an operating state of the dosage-dispensing device, linearly advances towards the dosage-dispensing unit for a clutch engagement of the drive shaft with the closure element and the opening of the delivery orifice, the drive shaft having limited linear mobility relative to the drive unit in a direction away from the dosage-dispensing unit to prevent a premature opening of the delivery orifice during the clutch engagement;
    wherein the closure spring holds the closure element in the closed position up to the point where the clutch engagement is completed.

2. The dosage-dispensing device of claim 1, wherein:
the closure element and the drive shaft are driven in rotary movement.

3. The dosage-dispensing device of claim 2, further comprising:
an impact mechanism whose impacts can be transferred to the closure element independently of the momentary position of the closure element relative to the delivery orifice and independently of an opening- or closing movement of the closure element.

4. The dosage-dispensing device of claim 3, wherein:
the impact mechanism transfers the impacts to the closure element through the drive shaft.

5. The dosage-dispensing device of claim 3, wherein:
the impact mechanism comprises a tensioning mechanism and a lever.

6. The dosage-dispensing device of claim 5, wherein:
the drive shaft comprises an impact surface area; and
the lever comprises a play-adjusting device, in particular a play adjustment screw, for adjusting the impact play between the lever and the impact surface area.

7. The dosage-dispensing device of claim 5, wherein:
the impact mechanism comprises an impact amplitude adjusting device, in particular an adjustable end stop for the lever.

8. The dosage-dispensing device of claim 7, wherein:
at least one of the impact amplitude adjusting device and the play-adjusting device comprises an adjustment-actuating drive.

9. The dosage-dispensing device of claim 5, further comprising:
a hammer mass, arranged on the lever.

10. The dosage-dispensing device of claim 3, wherein:
the impact mechanism comprises:
an impact transfer member connected to the drive shaft; and
a crown sleeve supported by the receiving device,
wherein impacts can be generated and transmitted to the drive shaft by the impact transfer member through the tracking of the contours of serrations formed on the crown sleeve.

11. The dosage-dispensing device of claim 10, wherein:
the crown sleeve is supported on the receiving device so as to be capable of being driven in rotary movement.

12. The dosage-dispensing device of claim 4, wherein:
the impact mechanism comprises:
an impact transfer member connected to the drive shaft; and
a crown sleeve supported by the receiving device,
wherein impacts can be generated and transmitted to the drive shaft by the impact transfer member through the tracking of the contours of serrations formed on the crown sleeve.

13. The dosage-dispensing device of claim 12, wherein:
the crown sleeve is supported on the receiving device so as to be capable of being driven in rotary movement.

14. The dosage-dispensing device of claim 1, further comprising:
a sensor arranged to monitor the clutch engagement.

15. The dosage-dispensing device of claim 1, wherein:
the closure element has a principally cylindrical shape that comprises:
a closure portion that closes off the delivery orifice; and
a delivery portion with at least one depression that is recessed from the circumference of the cylinder, the delivery portion arranged adjacent to the closure portion and serving to deliver dosage-material.

16. The dosage-dispensing device of claim 1, wherein:
the closure spring has a spring force selected based upon the properties of the dosage material being dispensed.

17. The dosage-dispensing device of claim 1, wherein:
the clutch engagement is achieved by a coupling portion with a six-lobe profile on the drive shaft and a coupling portion on the closure element with an internal six-lobe profile matched to the drive shaft six-lobe profile.

18. A method for readying a dosage-dispensing device to dispense a material, comprising the steps of:
providing a dosage-dispensing device according to claim 1;
arranging the drive unit of the dosage-dispensing device for inserting a dosage-dispensing unit;
setting the dosage-dispensing unit into the receiving device of the dosage-dispensing unit, and
moving the drive unit linearly towards the dosage-dispensing unit with the drive shaft rotating slowly, until the respective clutch portions of the drive shaft and the closure element engage and a sensor detects the completion of the clutch engagement and sends a signal to a control- and regulating unit of the dosage-dispensing device indicating that the dosage-dispensing device is ready for operation.

19. The dosage-dispensing device of claim 1, wherein:
the clutch engagement is achieved by a pair of corresponding lobe-profile coupling portions, one of which is on the drive shaft and the other of which is on the closure element.

* * * * *